(12) United States Patent
Gulli et al.

(10) Patent No.: US 8,046,357 B2
(45) Date of Patent: Oct. 25, 2011

(54) SAMPLING INTERNET USER TRAFFIC TO IMPROVE SEARCH RESULTS

(75) Inventors: Antonino Gulli, Pisa (IT); Antonio Savona, Sora (IT); Monica Mori, Pisa (IT)

(73) Assignee: IAC Search & Media, Inc., Oakland, CA (US)

( * ) Notice: Subject to any disclaimer, the term of this patent is extended or adjusted under 35 U.S.C. 154(b) by 317 days.

(21) Appl. No.: 11/268,996

(22) Filed: Nov. 7, 2005

(65) Prior Publication Data

US 2007/0112730 A1    May 17, 2007

(51) Int. Cl.
*G06F 7/00* (2006.01)
(52) U.S. Cl. ........................................................ 707/726
(58) Field of Classification Search .................. 707/726, 707/999.007
See application file for complete search history.

(56) References Cited

U.S. PATENT DOCUMENTS

| | | | | |
|---|---|---|---|---|
| 5,870,559 A | * | 2/1999 | Leshem et al. | 709/224 |
| 6,182,068 B1 | * | 1/2001 | Culliss | 707/5 |
| 6,539,377 B1 | * | 3/2003 | Culliss | 707/5 |
| 6,584,464 B1 | * | 6/2003 | Warthen | 707/4 |
| 6,816,850 B2 | * | 11/2004 | Culliss | 707/1 |
| 7,107,619 B2 | * | 9/2006 | Silverman | 726/27 |
| 2001/0035885 A1 | * | 11/2001 | Iron et al. | 345/855 |
| 2004/0030741 A1 | * | 2/2004 | Wolton et al. | 709/202 |
| 2005/0076111 A1 | * | 4/2005 | Cherkasova et al. | 709/224 |

OTHER PUBLICATIONS

Cho et al., "Impact of Search Engines on Page Popularity", Copyright held by the author/owner(s). WWW2004, May 17-22, 2004 New York, NY USA. ACM xxx.xxx, pp. 10 total.
Borodin et al., "Link Analysis Ranking: Algorithms, Theory, and Experiments", ACM Transactions on Internet Technology, vol. 5, No. 1, Feb. 2005, pp. 231-297.

* cited by examiner

*Primary Examiner* — Robert Timblin
*Assistant Examiner* — Nirav K Khakhar
(74) *Attorney, Agent, or Firm* — Stephen M. De Klerk

(57) ABSTRACT

Methods, systems and apparatus for improving Internet search results include monitoring network activity on a communications network, generating a near real-time map of the network activity, and integrating the near real-time map with a search engine.

48 Claims, 7 Drawing Sheets

SAMPLING INTERNET USER TRAFFIC TO IMPROVE SEARCH RESULTS

TECHNICAL FIELD

This invention relates generally to Internet search engines and, more particularly, to improving the freshness, coverage, ranking and clustering of search results.

BACKGROUND

Internet search engines are sites on the World Wide Web (the web) that are designed to help people find information stored on other sites. While there are differences in the ways that various search engines work, they all perform three basic tasks. First, they periodically crawl the web, or selected portions of the web, for important documents. Second, they store all of the important words (keywords) used in the documents and where the words are found. Third, they employ some type of ranking algorithm that attempts to rank web documents by relevance to a user's search term or combination of search terms when the user submits a query to the search engine.

To find information on the billions of web pages that exist, search engines employ software robots, called spiders or web crawlers, to build lists of the words found on web sites. Typically, a spider will begin its search on heavily used web servers and on popular web sites, storing words from the web sites' pages and following every hyperlink found within the site. In this way, the spider software quickly spreads across the most widely used portions of the web. Different spiders use different strategies or combinations of strategies for collecting web page information. For example, some spiders may look at every word on a web page and where the word is located (e.g., in the title, in sub-headings, in the first 20 lines, etc.). Other spiders may keep track of the most frequently used words in the page and/or the words used in each hyperlink. Still others may collect meta-tags, which are keywords under which the web page owner wants the page to be indexed.

Once the spiders have gathered a sufficient amount of web page data (the task is never actually completed due to the dynamic nature of the web), the search engine must store the information in a way that makes it useful to web engine users. There are two key components involved in making the gathered data accessible to users: the information stored with the data and the method by which the information is indexed. For example, a search engine might store the number of times a word is used in a web page and assign a relevance score to the web page based of the count. A search engine might also assign a weight to a search term based on its location in a web page, with increasing values as they appear near the top of the page, in-sub-headings, in links, in meta tags or in the title of the page, for example.

Regardless of the particular method used to rank web pages in response to a user's query, this approach to search engine design has several significant drawbacks. First, the ranking algorithms are biased toward older pages because there are usually more links pointing to an older page than there are links pointing from the older page. Second, the ranking method is self-reinforcing because pages that are highly ranked will be linked to by more users, which will increase the ranking. This "all roads lead to Rome" phenomenon can continue even after the web page is inactivated (becomes a dead page), because the sheer size of the web prevents any search engine with a single point of view (i.e., the search engines web crawler) to cover the entire web in a short period of time. Third, user navigation to web pages without the use of hyperlinks (e.g., by entering a URL directly into a web browser) is not part of the search engine ranking calculus.

SUMMARY OF THE INVENTION

Methods, systems and apparatus for improving the freshness, the coverage, the ranking and the clustering of search engine results are described.

According to one aspect of the invention, a method includes monitoring network activity on a communications network, generating a near real-time map of the network activity and integrating the near real-time map of the network activity with a search engine.

The communications network may include the World Wide Web (WWW) and monitoring the network activity may include monitoring web traffic on remote web servers on the communications network.

The near real-time map may be a web graph based on the monitored web traffic. The web graph may be a directed graph which includes nodes (web nodes) representing web objects and edges (web Edges) representing weighted links between the nodes. The links may represent hyperlinks between web objects and/or user navigation between the web objects without hyperlinks. The weight of the web edges may depend on the frequency of use and/or the temporal currency of the use, increasing with frequent and/or current use and decreasing with infrequent use and/or non-recent use. Virtual edges may be created between two unconnected nodes when many users navigate between the nodes.

Other aspects of the invention and exemplary embodiments thereof are described below, including a system and an apparatus for performing the methods described herein.

BRIEF DESCRIPTION OF THE DRAWINGS

The present invention is illustrated by way of example, and not by limitation, in the figures of the accompanying drawings in which.

DETAILED DESCRIPTION

In the following description, numerous specific details are set forth such as examples of specific components, devices, methods, etc., in order to provide a thorough understanding of embodiments of the present invention. It will be apparent, however, to one of ordinary skill in the art that these specific details need not be employed to practice embodiments of the present invention. In other instances, well-known materials or methods have not been described in detail in order to avoid unnecessarily obscuring embodiments of the present invention. The term "coupled" as used herein, may mean directly coupled or indirectly coupled through one or more intervening components or systems, whether electrically, optically, wirelessly or by any other means.

Unless stated otherwise as apparent from the following discussion, it will be appreciated that terms such as "processing," "computing," "determining," "searching" or the like may refer to the actions and processes of a computer system, or similar electronic computing device, that manipulates and transforms data represented as physical (e.g., electronic) quantities within the computer system's registers and memories into other data similarly represented as physical within the computer system memories or registers or other such information storage, transmission or display devices. Embodiments of the method described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

Figure 1:
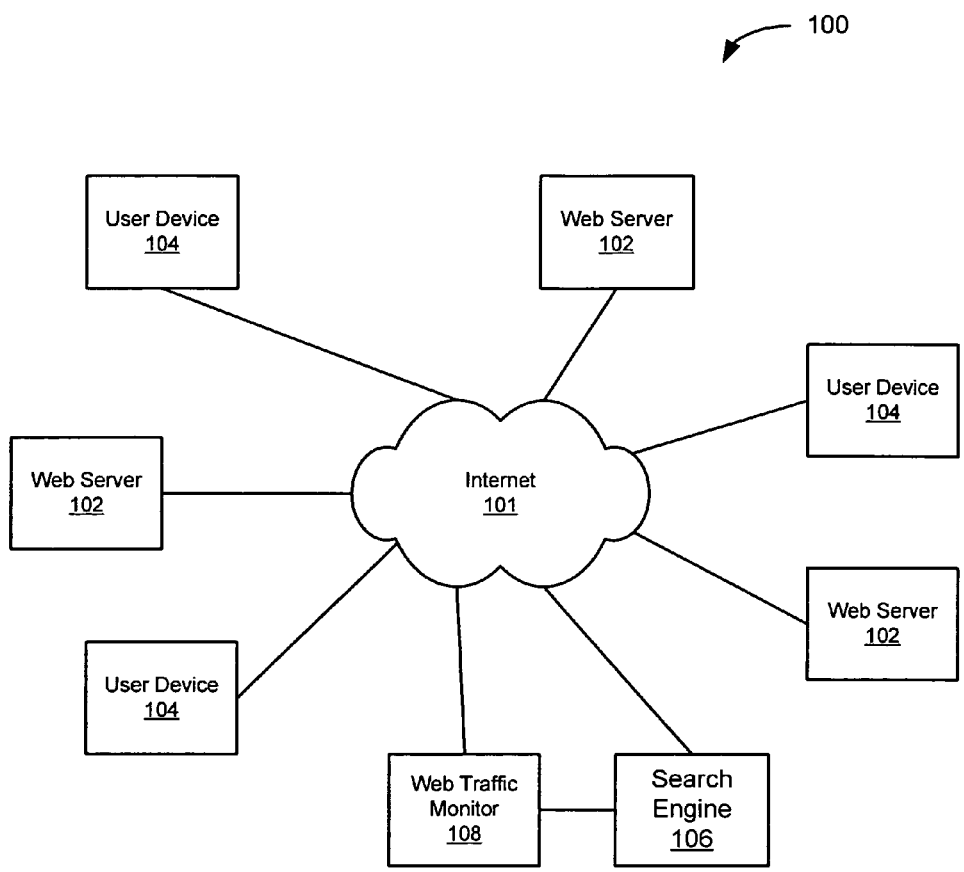
FIG. 1 is a schematic diagram illustrating a communications system in which embodiments of invention may be implemented.

FIG. 1 illustrates a communications network 100 in which embodiments of the invention may be implemented. In FIG. 1, web servers 102 are connected to the Internet 101 to serve web pages to user devices 104. It will be appreciated that while only a small number of web servers 102 and user devices 104 are illustrated in FIG. 1, the actual number may be much greater in practice. User devices 104 may be any type of computing device capable of running a web browser. For example, a user device 102 may be any type of desktop computer, laptop computer, tablet computer, PDA or the like. Web servers 102 may be any type of computing devices or systems having software programs capable of transmitting HTML text files to the user devices 104 in response to web page requests from the user devices 104. Web servers 102 may include, for example, proxy servers and/or transparent proxy servers (proxy servers directly connected to routers). Web servers, proxy servers, transparent proxy servers and HTML file protocols are known in the art and, accordingly, are not described in detail, here. In one embodiment, web servers 102 may be associated with one or more Internet service providers (ISPs) as described in greater detail below.

In one embodiment, a search engine 106 receives queries from one or more user devices 104 and provides lists of web pages to the user devices 104 based, at least in part, on web traffic data provided by web traffic monitor 108. Web traffic monitor 108 receives web traffic data from web servers 102. Web traffic data may include information from access logs (not shown) maintained by the web servers 102. The access logs maintained by the web servers 102 may contain records of user accesses to web pages on the web servers, including information contained in Hypertext Transfer Protocol reference (HTTP_REFER) tags that identify the web page that a user navigated from (e.g. via hyperlink or URL input) to the requested web page. The web traffic data may be communicated from the web servers 102 to the web traffic monitor 108 using any communication methods known in the art. For example, the data may be communicated over the Internet using the FTP protocol. The communication links between the web servers 102 and the web traffic monitor 108 may be conventionally routed connections or VPN (virtual private network) connections for example.

Figure 2A:
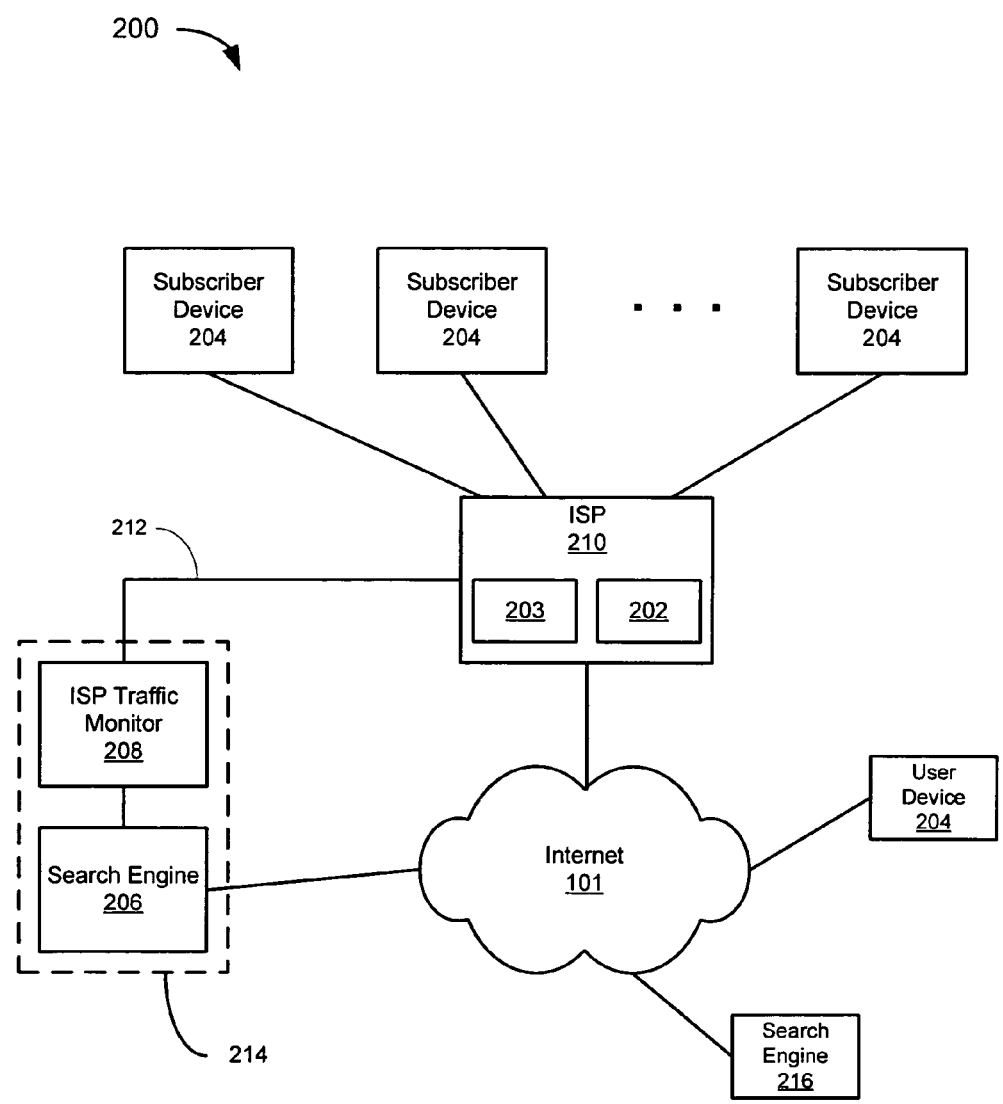
FIG. 2A is a block diagram illustrating another communications system in which embodiments of the invention may be implemented.

In one embodiment, as illustrated in FIG. 2A in a communications system 200, an internet service provider (ISP) 210 provides access to the Internet 101 for a number of subscriber devices 204, which may be, for example, the same types or classes of devices as user devices 104. The ISP 210 may include one or more web servers 202 to serve web pages to the subscriber devices 204. The ISP may also maintain one or more subscriber activity logs or files 203, which may record some or all of the navigation of the user devices on the WWW. In one embodiment, an enhanced search engine 214 has a proprietary connection 212 with ISP 210 to obtain the activity logs 203 in near real-time, which may be processed in an ISP traffic monitor 208 integrated with search engine 206 in the enhanced search engine 214. It will be appreciated by one of ordinary skill in the art that the configuration of FIG. 2 may be scaled to a hierarchical configuration of ISPs, which may include local, regional and/or global ISPs and which may also include hierarchical configurations of web servers.

Figure 2B:
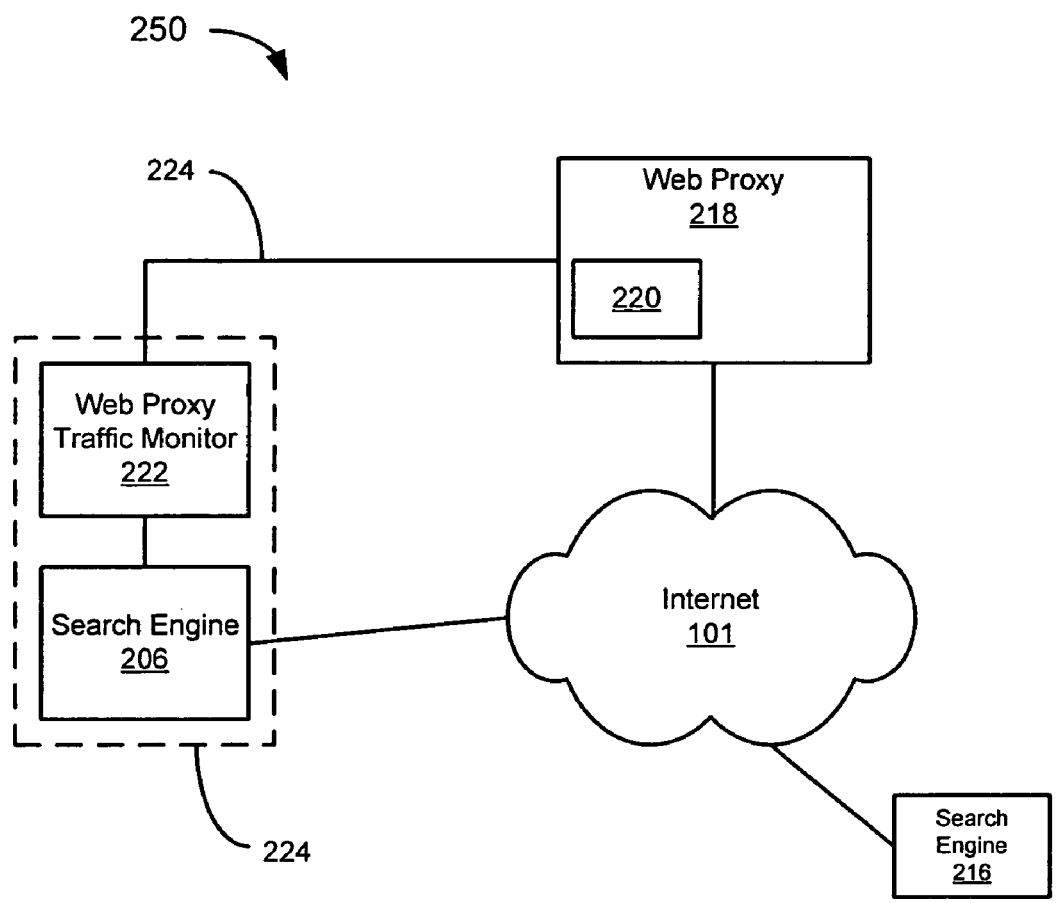
FIG. 2B is a block diagram illustrating yet another communications system in which embodiments of the invention may be implemented.

In one embodiment, as illustrated in FIG. 2B in a communications system 250, an enhanced search engine 224 may have a proprietary connection 226 to one or more web proxy servers 218. Proxy server(s) 218 may maintain web activity log(s) 220, which may record some or all of the web activity of user devices 204 on the WWW that are served by the proxy server(s). The enhanced search engine 224 may obtain the web activity log(s) 220 in near real-time, which may be processed in a web proxy traffic monitor 222 integrated with search engine 206 in the enhanced search engine 224. In one embodiment, the function of the proxy server(s) in FIG. 2B may be performed by routers at the HTTP protocol level, for example.

A search engine such as search engine 206 may use web traffic data obtained by ISP traffic monitor 208 to generate a near real-time map of the network activity of a large number of users on the WWW. The map, or web graph, may include web nodes, representing web objects and web edges representing weighted links between web nodes. A web object may include, for example, a web page, an audio file, a video file, an image file, or a collection of such web objects grouped by a common origin such as all the web pages belonging to a web site, all the images in an album, all the audio files contained in an online CD, or all the video files contained in an online DVD.

Figure 3:
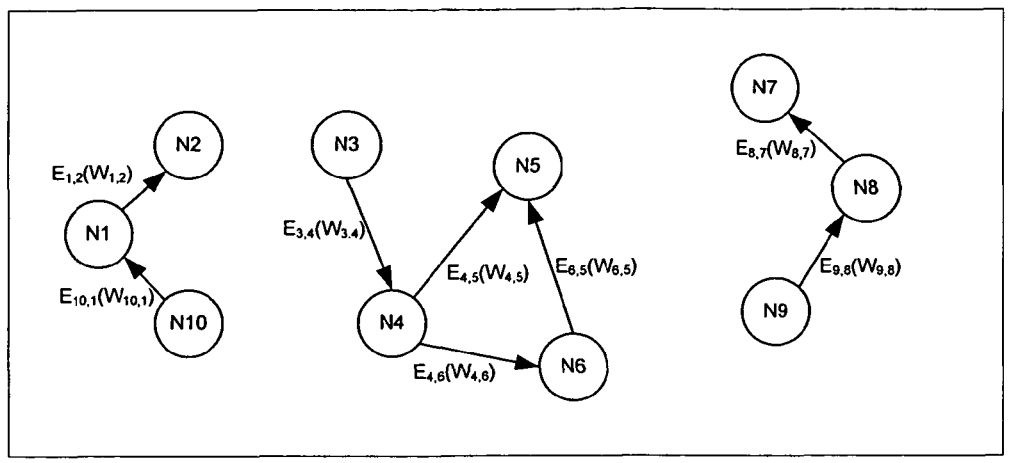
FIG. 3 is a web graph at a time T1.

FIG. 3 illustrates an exemplary web graph 300, in one embodiment, at a time $T_1$. The web graph 300 is illustrated with a limited number of web nodes ($N_1$-$N_{10}$) and web edges ($E_{i,j}$). It will be appreciated that an actual web graph may include hundreds, thousands or even many billions of web nodes and web edges depending on the coverage of the web servers and/or ISPs in the communications network. Each web edge $E_{i,j}$ may be associated with a weight $W_{i,j}$ representing the importance and/or freshness of the web edge. For example, each time a user (e.g., a user of one of the subscriber devices 204) navigates from one web node to another web node, the navigation may be captured by the web traffic monitor and the weight of the web edge between those two nodes may be incremented. In one embodiment, if an established web edge is not used for a specified period of time, the weight of the web edge may be decremented. Thus, the web graph 300 is capable of dynamically tracking the linkages between web nodes as they evolve, creating new web edges between web nodes as they are navigated and extinguishing web edges between web nodes when they fall into disuse for a sufficient period of time. Similarly, new web nodes may be added to the web graph 300 as they are created, or deleted from the web graph 300 if they are not accessed.

Figure 4:
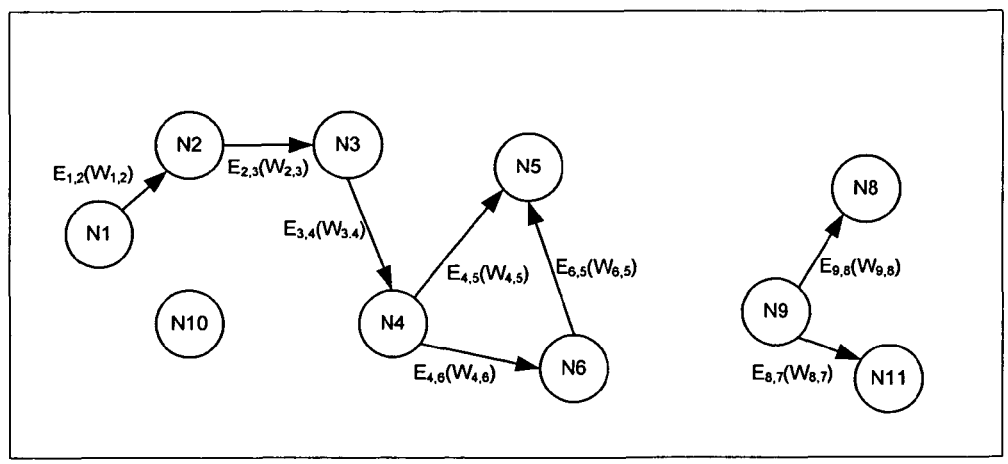
FIG. 4 is a web graph at a time T2.

FIG. 4 illustrates such a dynamic adaptation in the exemplary web graph 300 at a time $T_2$. In FIG. 4, web edge $E_{2,3}$, which did not exist at time $T_1$, has been created by user navigation between web nodes $N_2$ and $N_3$. Conversely, web edge $E_{10,1}$ between web nodes $N_{10}$ and $N_1$ has been extinguished following a specified period of disuse. Similarly, new node $N_{11}$ has been created and linked to node $N_9$ by web edge $E_{9,10}$, and node $N_7$ and its link $E_{8,7}$ from node $N_8$ has been deleted.

As described above, the web graph may be based on all of the web traffic in a particular communications network, which may include user navigation using hyperlinks between web objects as well as direct entries of URLs (uniform resource locators) into web browsers and/or selections from "favorites" lists in web browsers. Therefore, the weights of the web edges in the web graph may represent all the aforementioned navigation methods and any other methods used to navigate between web objects.

The web graph 300 is integrated with a search engine to improve the ranking results of the search engine. For example, a web crawler in search engine 206 of FIG. 3 may be configured to crawl the web objects identified in the web graph 300 and anchor each web edge with portions of text surrounding a hyperlink in the web object that links the web object to another web object at the other end of the web edge. Then, when a search request (query) from a user invokes some portion of the anchor text, the search engine can rank the search results based on the weights of the web edges in the web graph that are anchored by keywords in the query.

In one embodiment, the web graph 300 is used to remove bias in search results. For example, when a web node (representing a web object) is connected to one or more other web nodes by corresponding one or more web edges, the web object may be assigned a weight (importance) based on the weights of the one or more web edges that the web node is connected to. This method may be applied to all of the web nodes in web graph 300. The weight of a web node may be computed from the weights of the one or more web edges that connect to the web node as well as the weights of the web nodes that connect to the other ends of the one or more web edges. For example, in FIG. 4, the weight of web node $N_5$ may be computed from the weights of web edges $E_{4,5}$ and $E_{6,5}$ as well as the weights of nodes $N_4$ and $N_6$. The computed weights of the web nodes may be used to generate a relevance score for ranking the web objects corresponding to the web nodes in web graph 300 in search engine 206. In another embodiment, the computed weight of a web node may be used to add a web node to the index of search engine 206 if the computed weight exceeds a predetermined threshold. In a further embodiment, the computed weight of a web node may be used to delete the web object from the index of search engine 206 if the computed weight drops below the predetermined threshold.

In one embodiment, the ISP web traffic monitor 208 (or equivalently, web traffic monitor 108) is used in conjunction with web graph 300 to eliminate dead web objects from search results. For example, when a user navigation request points to a dead web object (e.g., a defunct or extinct web page), the web server 202 serving the user will generate a missing object error that will be transmitted to the user, logged in the activity log 203 and communicated to the ISP traffic monitor 208. The web graph 300 may then be modified to eliminate the web edges that were connected to the dead web object in the existing web graph. Thus, bad search results may be eliminated quickly (e.g., without waiting for a web crawler to discover the dead web object).

In one embodiment, the web graph 300 is used to improve search results in one search engine based on the search results in another search engine. Referring again to FIG. 2, a search engine 216, connected to the Internet 101, may be queried by a user of a subscriber device 204. The search engine 216 will return search results to the user, and the user may pick one of the search results and navigate to the selected web object. All of the user activity (e.g., including the query and the pick) may be logged in activity log 203 and used by web traffic monitor 208 to update web graph 300. For example, the query and the selected object from the search engine 216 may be associated with each other in search engine 206.

In one embodiment, the web graph 300 is used to improve the clustering of web objects and/or queries (e.g., the association of different queries with a common web object). For example, a user of a subscriber device 204 may submit a query to search engine 216 (e.g., keyword "Madonna") and may pick a web object from a pick list generated by search engine 216, www.rockstars.com, for example. Another user of another user device 204 may submit a different query to search engine 206 (e.g., "Britney Spears") and may be presented with a pick list that also includes www.rockstars.com. If the second user also selects www.rockstars.com, then the ISP activity log 203 will reflect both queries and navigation choices, and the two different queries may be clustered in the index of search engine 206 and associated with www.rockstars.com.

Figure 5A:
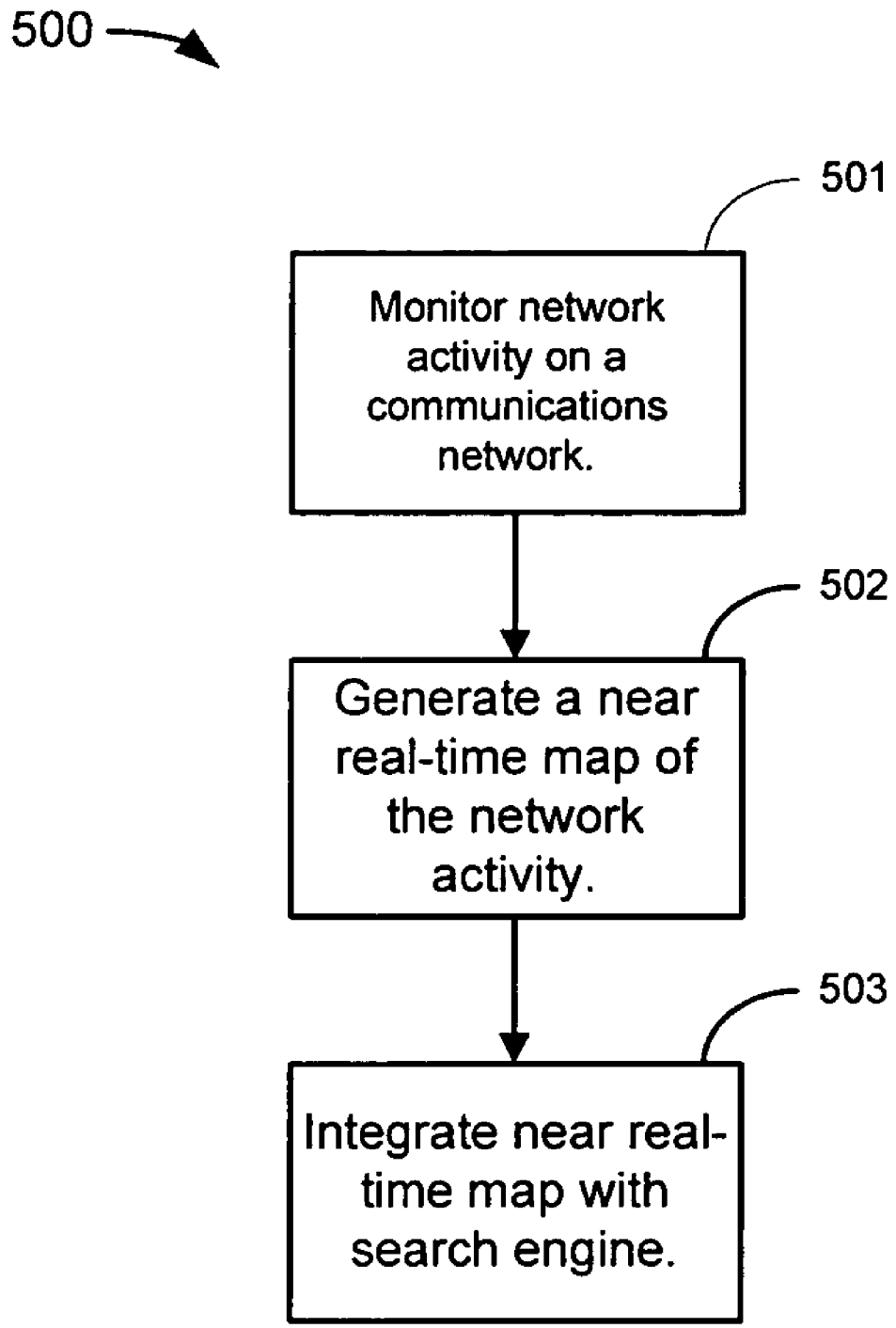
FIG. 5A is a flowchart illustrating a method in one embodiment.

In another embodiment, the freshness of search results may be improved by monitoring and analyzing bursts of web traffic (e.g., many accesses per unit time). An important (e.g., popular) set of web pages may be clustered (associated) by monitoring and analyzing bursts of web traffic toward the set of web pages that decays after a period of time. For example, a set of web pages and queries associated with a natural disaster (e.g., an earthquake) may be clustered and heavily weighted immediately after the natural disaster (e.g., in proportion to a query rate), but the weights may decrease rapidly (e.g., exponentially) thereafter as interest and web activity wanes. The clustering may be maintained only as long as the web activity (e.g., queries per unit time) is sustained above a specified threshold level Thus, a method has been described for improving the freshness, the coverage, the ranking and the clustering of search results. As illustrated in FIG. 5A, the method 500 may include monitoring network activity on a communications network (step 501); generating a near real-time map of the network activity (step 502); and integrating the near real-time map in a search engine (step 503).

Figure 5B:
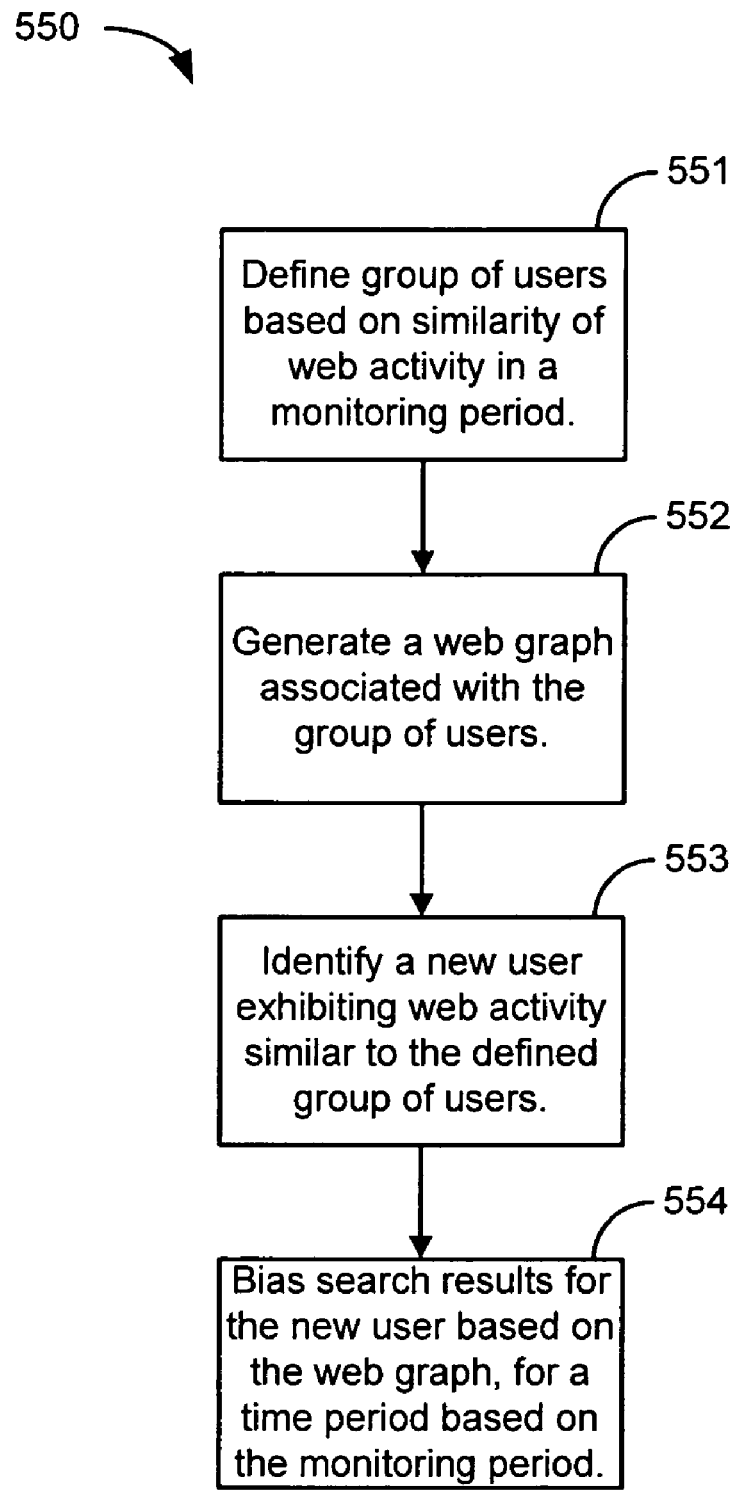
FIG. 5B is a flowchart illustrating a method in another embodiment.

In another embodiment, illustrated in method 550 of FIG. 5B, search results for an individual user may be personalized by monitoring and analyzing web traffic. A group of users may be defined based on similarities of web activity during a monitoring period (step 551). For example, activity may be tracked by geographical location, by the number of similar web sites visited during the monitoring period, by the number of similar queries submitted during the monitoring period, or any other metric that may be available from the web traffic data. For example, web traffic data may be associated with a definable group of users and a separate web graph may be generated for that group of users. The activities of individual users may be tracked, for example, by the user's IP (Internet Protocol) address and/or the use of cookies. A web graph may be generated that is associated with the defined group of users (step 552). Subsequently, a new user may be identified that exhibits web activity that is similar to one of the defined groups of users (e.g., geographic location, navigation, queries, etc) (step 553). Search results provided to the new user may then be biased by the web graph representing the web activity of the associated group of users for period of time related to the monitoring period of the group of users (step 554). For example, the bias may have a lifetime that persists for some multiple of the monitoring period used to define the group of users associated with the web graph for that group of users.

Figure 6:
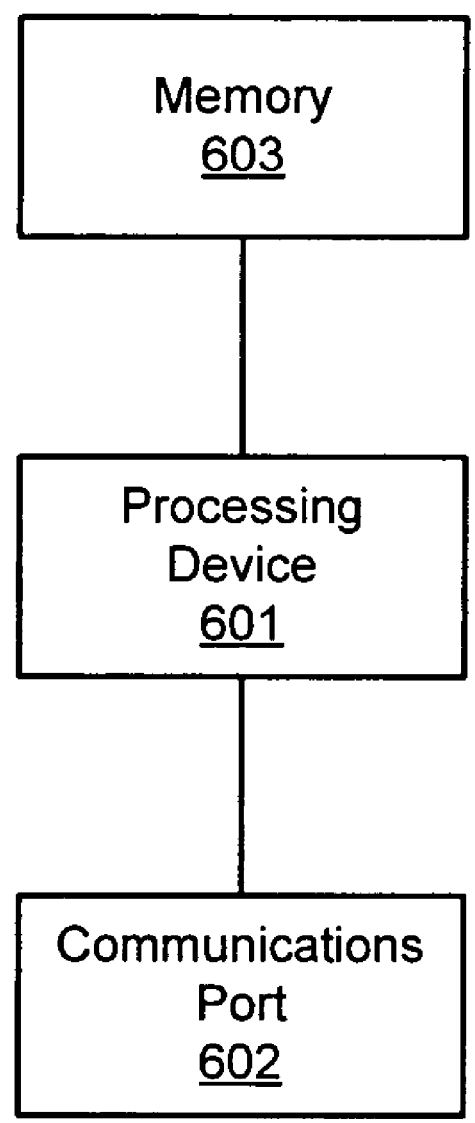
FIG. 6 is a block diagram of a system usable with the method in the embodiment of FIG. 5.

FIG. 6 is a block diagram illustrating a representative enhanced search engine, such as enhanced search engine 214, in which the methods described herein may be implemented. The enhanced search engine 214 may include a processing device 601 (e.g., a processor, microchip, central processing unit, or computer) that is in communication with or otherwise uses or includes one or more communication ports 602 for communicating with user devices, web servers, ISPs and/or other devices and/or systems. Communication ports may include such things as local area network adapters, wireless communication devices, etc. Processing device 601 may be, for example, a general purpose processor such as the Pentium™ microprocessor manufactured by Intel Corporation, or equivalent processors available from Motorola, Inc., AMD or Sun Microsystems, Inc. Processing device 601 may also be, for example, a special purpose processing device such as an application specific integrated circuit (ASIC), field programmable gate array (FPGA), digital signal processor (DSP) or the like. Alternatively, processing device 601 may comprise more than one microprocessor, computer, computer system, etc.

The enhanced search engine 214 may also include a memory or data storage device 603 to store information, software, databases, search terms, search indexes, web graphs, device drivers, navigation path options, etc. The memory or data storage device 603 may comprise an appropriate combination of magnetic, optical and/or semiconductor memory, and may include, for example, Random Access Memory (RAM), Read-Only Memory (ROM), a tape drive, flash memory, a floppy disk drive, a flash memory drive, a compact disc and/or a hard disk or the like.

The processing device 601 and the memory 603 in the enhanced search engine 214 may each be, for example: (i) located entirely within a single computer or other computing device; or (ii) connected to each other by a remote communication medium, such as a serial port cable, telephone line or radio frequency transceiver. In one embodiment, the enhance search engine 214 may comprise one or more computers that are connected to a remote server computer for maintaining databases.

It will be apparent from the foregoing description that aspects of the present invention may be embodied, at least in part, in software. That is, the techniques may be carried out in a computer system or other data processing system in response to its processor, such as processing device 601, for example, executing sequences of instructions contained in a memory, such as memory 603, for example. In various embodiments, hardware circuitry may be used in combination with software instructions to implement the present invention. Thus, the techniques are not limited to any specific combination of hardware circuitry and software or to any particular source for the instructions executed by the data processing system. In addition, throughout this description, various functions and operations may be described as being performed by or caused by software code to simplify description. However, those skilled in the art will recognize what is meant by such expressions is that the functions result from execution of the code by a processor or controller, such as processing device 601.

A machine-readable medium can be used to store software and data which when executed by a data processing system causes the system to perform various methods of the present invention. This executable software and data may be stored in various places including, for example, memory 603 or any other device that is capable of storing software programs and/or data.

Thus, a machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM); random access memory (RAM): magnetic disk storage media; optical storage media; flash memory devices; etc.), and acoustical storage media; etc.

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method, comprising:

monitoring network activity in an activity log at a network access node on a communications network, wherein the communications network comprises the World Wide Web (WWW), and wherein the network access node comprises one of a web proxy server and an Internet service provider (ISP), and wherein the network activity comprises web traffic on the WWW;

transferring network activity data from the activity log to a network traffic monitor via a proprietary data link;

generating a near real-time map of the network activity from the network activity data, wherein generating the near real-time map of the network activity comprises generating a web graph from the web traffic, the web graph comprising a plurality of web nodes linked by a plurality of web edges, wherein each of the plurality of web nodes represents a corresponding web object and each of the plurality of web edges represents a weighted link from a first web object to a second web object, wherein a weight of the weighted link is based on a frequency of navigation between the first web object and the second web object;

integrating the near real-time map of the network activity with search engine data acquired via a nonproprietary data link;

receiving a search request from a user;

extracting search results in response to the search request according to their relevance to the search request from the search engine data including the integration of the near real-time map of the network activity and the search engine data;

preparing a list of search results wherein the highest ranked search results are placed at the beginning of the list, the ranking being based on the respective weights of the web edges; and returning the list of ranked search results to the user.

2. The method of claim 1, wherein integrating the near real-time map of the network activity with the search engine data comprises:

updating a keyword index of the search engine data with the network activity data;

adding and deleting web objects in the search engine data based on the web graph; and clustering web objects and search engine queries based on the web graph.

3. The method of claim 1, further comprising:

creating a web edge when a user navigates between the first web object and the second web object without a pre-existing web edge; and extinguishing the web edge after a specified period of disuse.

4. The method of claim 1, further comprising:

incrementing a weight of the web edge each time a hyperlink in the first web object is used to navigate from the first web object to the second web object; and decrementing the weight of the web edge after the specified period of disuse.

5. The method of claim 1, further comprising:

incrementing a weight of the web edge each time the user navigates from the first web object to the second web object without using a hyperlink; and decrementing the weight of the web edge after the specified period of disuse.

6. The method of claim 4, further comprising anchoring the web edge with an anchor comprising a portion of text surrounding the hyperlink in the first web object.

7. The method of claim 6, wherein a search request invokes at least some portion of the anchor, further comprising ranking a search result in a search engine based on the weight of the web edge linking the first web object to the second web object.

8. The method of claim 1, wherein monitoring-the network activity comprises extracting HTTP_REFER tags from the activity log at the network access node.

9. The method of claim 1, wherein a web object in the web graph is connected to one or more web edges, wherein a weight of the web object corresponds to the weights of the one or more web edges, further comprising adding the web object to a search engine index when the weight of the web object exceeds a predetermined threshold, and deleting the web object from the search engine index when the weight of the web object falls below the predetermined threshold.

10. The method of claim 9, further comprising generating a relevance score for the web object based on the weight of the web object and a ranking of the web object in a search result.

11. The method of claim 9, further comprising deleting the web object from the search engine index when the web traffic includes missing object errors for the web object.

12. The method of claim 1, wherein the web traffic includes a query and a pick in a first search engine, wherein the pick corresponds to a web object, the method further comprising associating the web object with the query in a second search engine.

13. The method of claim 1, wherein the web traffic includes a first query and a first pick in a first search engine corresponding to a web object and a second query and a second pick in a second search engine corresponding to the web object, the method further comprising clustering the first query and the second query in at least the first search engine.

14. The method of claim 1, wherein the web traffic comprises a burst of queries directed toward a set of web objects, the method further comprising clustering the set of web objects and the burst of queries in the search engine while the burst of queries is sustained above a predetermined threshold.

15. The method of claim 1, wherein the web graph is associated with the web traffic of a definable group of users having one or more web traffic metrics in common during a monitoring period, the method further comprising biasing the search results of a new user with the web graph when the new user exhibits web activity that is similar to the web traffic metrics of the definable group of users.

16. The method of claim 15, wherein the biasing of the search results has a defined lifetime related to the monitoring period.

17. A system, comprising:

a memory;

a communications port coupled to a network access node via a proprietary data link and to a communications network via a non-proprietary data link; and a processing device coupled with the memory and the communications port, the processing device configured as a search engine and further configured to:

monitor network activity data in an activity log at an access node on a communications network, wherein the communications network comprises the World Wide Web (WWW), and wherein the network access node comprises one of a web proxy server and an Internet service provider (ISP), and wherein the network activity comprises web traffic on the WWW;

transfer network activity data from the network access node to the memory via the proprietary data link;

generate a near real-time map of the network activity from the network activity data, wherein to generate a near real-time map of the network activity the processing device is configured to generate a web graph from the web traffic, the web graph comprising a plurality of web nodes linked by a plurality of web edges, wherein each of the plurality of web nodes represents a corresponding web object and each of the plurality of web edges represents a weighted link from a first web object to a second web object, wherein a weight of the weighted link is based on a frequency of navigation between the first web object and the second web object ;

integrate the near real-time map of the network activity with search engine data acquired via the nonproprietary data link;

receive a search request from a user;

extract the search results in response to the search request according to their relevance to the search request from the search engine data including the integration of the near real-time map of the network activity and the search engine data;

prepare a list of search results wherein the highest ranked search results are placed at the beginning of the list, the ranking being based on the respective weights of the web edges; and return the list of ranked search results to the user.

18. The system of claim 17, wherein to integrate the near real-time map of the network activity with the search engine data, the processing device is configured to:

update a keyword index of the search engine data with the network activity data;

add and delete web objects in the search engine data based on the web graph; and cluster web objects and search engine queries based on the web graph.

19. The system of claim 17, wherein the processing device is further configured to:
create a web edge when a user navigates between the first web object and the second web object without a pre-existing web edge; and
extinguish the web edge after a specified period of disuse.

20. The system of claim 19, wherein the processing device is further configured to anchor the web edge with an anchor comprising a portion of text surrounding the hyperlink in the first web object.

21. The system of claim 20 wherein a search request invokes at least some portion of the anchor, wherein the processing device is further configured to rank a search result in a search engine based on the weight of the web edge linking the first web object to the second web object.

22. The system of claim 17, wherein the processing device is further configured to:
increment a weight of the web edge each time a hyperlink in the first web object is used to navigate from the first web object to the second web object; and
decrement the weight of the web edge after the specified period of disuse.

23. The system of claim 17, wherein the processing device is further configures to:
increment a weight of the web edge each time the user navigates from the first web object to the second web object without using a hyperlink; and
decrement the weight of the web edge after the specified period of disuse.

24. The system of claim 17, wherein to record the network activity, the processing device is configured to extract HTTP_REFER tags from the activity log at the network access node.

25. The system of claim 24, wherein the processing device is further configured to generate a relevance score for the web object based on a weight of the web object and a ranking of the web object in a search result.

26. The system of claim 24, wherein the processing device is further configured to delete the web object from the search engine index when the web traffic includes missing object errors for the web object.

27. The system of claim 17, wherein a web object in the web graph is connected to one or more web edges, wherein a weight of the web object corresponds to the weights of the one or more web edges, wherein the processing device is further configured to add the web object to a search engine index when the weight of the web object exceeds a predetermined threshold, and delete the web object from the search engine index when the weight of the web object falls below the predetermined threshold.

28. The system of claim 17, wherein the web traffic includes a query and a pick in a first search engine, wherein the pick corresponds to a web object, wherein the processing device is further configured to associate the web object with the query in a second search engine.

29. The system of claim 17, wherein the web traffic includes a first query and a first pick in a first search engine corresponding to a web object and a second query and a second pick in a second search engine corresponding to the web object, wherein the processing device is further configured to cluster the first query and the second query in at least the first search engine.

30. The system of claim 17, wherein the web traffic comprises a burst of queries directed toward a set of web objects, wherein the processing device is further configured to cluster the set of web objects and the burst of queries in the search engine while the burst of queries is sustained above a predetermined threshold.

31. The system of claim 17, wherein the web graph is associated with the web traffic of a definable group of users having one or more web traffic metrics in common during a monitoring period, wherein the processing device is further configured to bias the search results of a new user with the web graph when the new user exhibits web activity that is similar to the web traffic metrics of the definable group of users.

32. The system of claim 31, wherein the bias of the search results has a defined lifetime related to the monitoring period.

33. An article of manufacture, comprising a machine-readable storage medium including machine-accessible instructions that when accessed by a data processing system, cause the data processing system to perform operations, comprising:
monitoring network activity in an activity log at a network access node on a communications network, wherein the communications network comprises the World Wide Web (WWW), and wherein the network access node comprises one of a web proxy server and an Internet service provider (ISP), and wherein the network activity comprises web traffic on the WWW;
transferring network activity data from the activity log to a network traffic monitor via a proprietary data link;
generating a near real-time map of the network activity from the network activity data, wherein generating the near real-time map of the network activity comprises generating a web graph from the web traffic, the web graph comprising a plurality of web nodes linked by a plurality of web edges, wherein each of the plurality of web nodes represents a corresponding web object and each of the plurality of web edges represents a weighted link from a first web object to a second web object, wherein a weight of the weighted link is based on a frequency of navigation between the first web object and the second web object;
integrating the near real-time map of the network activity with search engine data acquired via a nonproprietary data link;
receiving a search request from a user;
extracting search results in response to the search request according to their relevance to the search request from the search engine data including the integration of the near real-time map of the network activity and the search engine data;
preparing a list of search results wherein the highest ranked search results are placed at the beginning of the list, the ranking being based on the respective weights of the web edges; and
returning the list of ranked search results to the user.

34. The article of manufacture of claim 33, wherein integrating the near real-time map of the network activity with the search engine data comprises:
updating a keyword index of the search engine data with the network activity data;
adding and deleting web objects in the search engine data based on the web graph; and
clustering web objects and search engine queries based on the web graph.

35. The article of manufacture of claim 33, further including instructions that, when accessed by the data processing system, cause the data processing system to perform operations, comprising:

creating a web edge when a user navigates between the first web object and the second web object without a pre-existing web edge; and extinguishing the web edge after a specified period of disuse.

36. The article of manufacture of claim 33, further including instructions that, when accessed by the data processing system, cause the data processing system to perform operations, comprising:

incrementing a weight of the web edge each time a hyperlink in the first web object is used to navigate from the first web object to the second web object; and decrementing the weight of the web edge after the specified period of disuse.

37. The article of manufacture of claim 36, further including instructions that, when accessed by the data processing system, cause the data processing system to perform operations, comprising:

anchoring the web edge with an anchor comprising a portion of text surrounding the hyperlink in the first web object.

38. The article of manufacture of claim 37, wherein a search request invokes at least some portion of the anchor, further including instructions that, when accessed by the data processing system, cause the data processing system to perform operations, comprising:

ranking a search result in a search engine based on the weight of the web edge linking the first web object to the second web object.

39. The article of manufacture of claim 33, further including instructions that, when accessed by the data processing system, cause the data processing system to perform operations, comprising:

incrementing a weight of the web edge each time the user navigates from the first web object to the second web object without using a hyperlink; and decrementing the weight of the web edge after the specified period of disuse.

40. The article of manufacture of claim 33, wherein recording the network activity comprises extracting HTTP_REFER tags from the activity log at the network access node.

41. The article of manufacture of claim 33, wherein a web object in the web graph is connected to one or more web edges, wherein a weight of the web object corresponds to the weights of the one or more web edges, further including instructions that, when accessed by the data processing system, cause the data processing system to perform operations, comprising:

adding the web object to a search engine index when the weight of the web object exceeds a predetermined threshold; and deleting the web object from the search engine index when the weight of the web object falls below the predetermined threshold.

42. The article of manufacture of claim 41, further including instructions that, when accessed by the data processing system, cause the data processing system to perform operations, comprising:

generating a relevance score for the web object based on the weight of the web object and a ranking of the web object in a search result.

43. The article of manufacture of claim 41, further including instructions that, when accessed by the data processing system, cause the data processing system to perform operations, comprising:

deleting the web object from the search engine index when the web traffic includes missing object errors for the web object.

44. The article of manufacture of claim 33, wherein the web traffic includes a query and a pick in a first search engine, wherein the pick corresponds to a web object, further including instructions that, when accessed by the data processing system, cause the data processing system to perform operations, comprising:

associating the web object with the query in a second search engine.

45. The article of manufacture of claim 33, wherein the web traffic includes a first query and a first pick in a first search engine corresponding to a web object and a second query and a second pick in a second search engine corresponding to the web object, further including instructions that, when accessed by the data processing system, cause the data processing system to perform operations, comprising:

clustering the first query and the second query in at least the first search engine.

46. The article of manufacture of claim 33, wherein the web traffic comprises a burst of queries directed toward a set of web objects, further including instructions that, when accessed by the data processing system, cause the data processing system to perform operations, comprising:

clustering the set of web objects and the burst of queries in the search engine while the burst of queries is sustained above a predetermined threshold.

47. The article of manufacture of claim 33, wherein the web graph is associated with the web traffic of a definable group of users having one or more web traffic metrics in common during a monitoring period, further including instructions that, when accessed by the data processing system, cause the data processing system to perform operations, comprising:

biasing the search results of a new user with the web graph when the new user exhibits web activity that is similar to the web traffic metrics of the definable group of users.

48. The article of manufacture of claim 47, wherein the biasing of the search results has a defined lifetime related to the monitoring period.

* * * * *